United States Patent [19]
Lindörfer et al.

[11] Patent Number: 4,576,513
[45] Date of Patent: Mar. 18, 1986

[54] PROCESS FOR TERMINAL STORAGE OF PUMPABLE WASTES

[75] Inventors: Walter Lindörfer, Kassel; Wilhelm Jahn-Held, Staufenberg, both of Fed. Rep. of Germany

[73] Assignee: Wintershall AG, Kassel, Fed. Rep. of Germany

[21] Appl. No.: 425,899

[22] Filed: Sep. 28, 1982

[30] Foreign Application Priority Data

Oct. 22, 1981 [DE] Fed. Rep. of Germany ....... 3141884

[51] Int. Cl.$^4$ .......................... B65G 5/00; B09B 1/00; C02F 7/00; G21F 9/24
[52] U.S. Cl. ..................... 405/128; 405/53; 210/747
[58] Field of Search ............... 405/53, 55–58, 405/128, 129, 263, 264, 267, 266; 166/305 D; 106/109; 210/747, 919, 170; 252/626, 633

[56] References Cited

U.S. PATENT DOCUMENTS

| 3,169,619 | 7/1965 | Shock | 405/128 |
| 3,236,053 | 2/1966 | Billue | 405/53 |
| 3,274,784 | 9/1966 | Shock | 405/128 |
| 3,379,013 | 4/1968 | Slagle | 405/128 |
| 3,720,609 | 3/1973 | Smith et al. | 405/263 X |
| 3,859,799 | 1/1975 | Jaco, Jr. | 210/747 X |
| 3,887,462 | 6/1975 | Lagess et al. | 210/747 X |
| 3,914,945 | 10/1975 | Bietlot | 405/53 |
| 3,920,795 | 11/1975 | Selmeczi | 405/264 X |
| 3,949,560 | 4/1976 | Clem | 405/264 |
| 3,959,172 | 5/1976 | Brownell et al. | 405/128 X |
| 3,980,558 | 9/1976 | Thompson | 405/128 X |
| 4,148,660 | 4/1979 | Lankard et al. | 106/109 X |
| 4,229,295 | 10/1980 | Krofchak | 405/263 X |
| 4,338,134 | 7/1982 | Munster | 405/128 X |
| 4,342,732 | 8/1982 | Smith | 405/128 X |
| 4,353,749 | 10/1982 | Ray et al. | 106/109 X |
| 4,367,985 | 1/1983 | Tomaszewski | 405/263 X |

Primary Examiner—Cornelius J. Husar
Assistant Examiner—Nancy J. Stodola
Attorney, Agent, or Firm—Michael N. Meller

[57] ABSTRACT

Pumpable wastes are mixed in salt caverns with soluble or dissolved salts, which crystallize at the cavern temperature with bonding of water of crystallization; or with organic waste materials which solidify in the liquid phase of the cavern contents or increase the density of the cavern contents; or with solid waste materials, whereby the specific gravity of the liquid phase is increased in order to narrow the difference between the specific gravity of the salt mineral of the cavern wall and the specific gravity of the liquid phase of the cavern contents and the caverns are sealed.

15 Claims, No Drawings

PROCESS FOR TERMINAL STORAGE OF PUMPABLE WASTES

FIELD OF THE INVENTION

This invention relates to the terminal storage of wastes. More particularly, it employs depleted salt mines or caverns containing water or salt solutions for such purposes.

BACKGROUND OF THE INVENTION

It is known to store liquids in caverns resulting from the removal of brine from salt deposits. During this storing operation, the cavern is worked as a system which is open to the surface, called "open system" for short, whereby the cavern is not yet provided with a permanent gas- and liquid-tight seal.

There occurs a decrease in the volume of such salt caverns because of the convergence of the surrounding salt deposits. The convergence of a cavern volume (K in %) in a salt deposit as a function of time (t in months) is discussed by Dreyer in "Kali und Steinsalz" 5 (1971), pages 473 to 478 employing a mathematical equation. As an example, the author calculates that for a salt cavern with a storage volume of 15,000 m$^3$ and having an average depth of 725 m, a cavern height of 100 m, a cavern diameter of 20 m, a cavern temperature of 37° C., an average depth pressure of 170 kp/cm$^2$ and a liquid internal pressure of 83 kp/cm$^2$, the volume convergence of $K = 0.0555 \cdot t \cdot 0.94$ in %. The convergence rate amounted to 0.26 m$^3$/day after one month and 0.23 m$^3$/day after 7 months.

With a thickness of the salt suspended above the cavern ridge of 150 m, the vertical displacement of the overhang of the salt amounts to 1 mm/month. If the ceiling rock were to consist of rock salt, there would be a vertical displacement on the earth's surface of 0.125 mm after one month.

If one were to consider a sphere as the idealized volume, by introducing a large volume of liquid such as sea water, the hydrostatic external pressure on the surface of the sphere would be increased in proportion to the depth of the sphere.

This pressure is uniformly exerted on the surface. This external pressure can be absorbed by a solid material such as by a steel sphere of corresponding wall thickness. Thus the internal pressure remains constant.

For a cavern volume in a salt deposit, the wall of the spherical cavity is formed of the surrounding salt rock.

This applies also for pear-shaped or cylindrical cavern volumes. However, in such cases the external pressure of the cavern volume is not determined. A convergence, or a volume contraction, occurs in caverns filled with air or water or aqueous salt solutions, in systems open to the surface. This convergence is less for "tougher" plastic rock salt, as calculated by Dreyer.

For storage in salt caverns over a long period of time or for terminal storage, it is necessary to avoid cracking of the ground in order to minimize the convergence until this comes to a standstill by equalization of the pressure.

In this connection, German Published Patent Application No. 2 225 664 discloses a process for deep storage of liquid or oozable radioactive, poisonous wastes, according to which these wastes are mixed above ground before disposal with cement or bitumen to form a slurry and pumped into the cavern. The slurry solidifies in the cavern to form a solid mass which diminishes the convergence. According to this process, small amounts of the wastes are mixed with large amounts of inert fillers with a correspondingly large expenditure for energy and technical apparatus. The cavern fill consists primarily of the filler which itself does not need to be stored.

German Patent No. 25 49 313 describes a process for terminal storage of liquids in salt caverns, whereby the stored liquids are overlaid with a substantially gas- and water-tight covering. Such a medium should consist of a mixture of styrene with cyclohexanol peroxide and cobalt accelerator, which hardens in the cavern. Such an overlying covering, however, can contribute little to lessening the occurrence of convergence.

The concurrently filed U.S. patent application Ser. No. 425,900, now U.S. Pat. No. 4,435,280 issued Mar. 1, 1984, entitled "Process for Storage of Recyclable Liquid Wastes in Underground Salt Caverns" by Lindorfer et al, discloses a process by which these cavities or salt caverns are used for only a limited time as reactors and intermediate storage place, as an open system. Accordingly, the acid components of the liquid wastes are neutralized before, during or after introduction into the cavern and the liquid wastes are allowed to stand for a sufficient length of time to separate the heavier from the lighter specific gravity components, whereby the lighter phase is pumped away for further treatment down to the surface of the heavier phase. The heavy metals, if any, dissolved in the remaining heavier phase are then treated by mixing with alkaline reacting compounds and after removal of the resulting sediment, the remaining salt solution is pumped away down to the surface of the sediment.

By this process, which is carried out in caverns operating as an open system, the question of compensating for convergence does not come up since complete filling of the storage volume can be avoided. Even in the case of complete exhaustion of the storage capacity, convergence is compensated for by pumping out an amount of the stored solution corresponding to the volume decrease and conducting it away or storing it in another cavern.

This process is however not suitable for terminal storage of non-recyclable wastes, since it is not desirable, especially during filling of the cavern, to remove partial amounts of the stored material to compensate for convergence. After complete filling of the storage capacity of the cavern and its final closing, the internal pressure of the stored material is so increased by convergence that it somewhat compensates for the pressure which the salt deposits surrounding the cavern exert on the stored material and thereby a pressure equilibrium is produced. Nonetheless, it can happen that through geological or perhaps technological influences cracks are formed in the surrounding salt deposits whereby the liquid cavern contents can penetrate into these cracks and decrease the solidity of the salt deposits surrounding the caverns in an undesirable way.

If in such caverns for the terminal storage of wastes, such as, for example, contaminated inorganic sludge; crystal-containing salt solutions; lime or gypsum sludge; suspensions of fly ash and flue dusts; sludge from slag production, rubber production, cellulose production; bitumen emulsions, acid resins or tars; sludge from petroleum and the like, are stored, it can lead to unwanted and above all, uncontrollable contamination of the underground.

SUMMARY OF THE INVENTION

The invention teaches how to solidify the liquid phase in a salt cavern which has been filled with pumpable wastes by increasing the specific gravity of this liquid phase as much as possible and indeed with the extensive relinquishment of the use of materials which, by themselves should not be stored.

A process for the storage of pumpable wastes has been found by introducing them into caverns in salt deposits and extensive solidification thereof. Accordingly, the water-containing liquid pumpable wastes which are put into the caverns and which can also contain suspended solids, are mixed with soluble or dissolved salts which crystallize at the cavern temperature or below with the bonding of water of crystallization; or with organic materials which solidify in the liquid phase of the cavern contents at the cavern temperature or increase the density of the cavern contents; or with solids.

DETAILED DESCRIPTION OF THE INVENTION

Examples of the aqueous, liquid, pumpable wastes, which can be terminally stored in salt caverns and treated according to the process of the invention are contaminated inorganic sludge, salt solutions, lime- and gypsum sludge, fly ash, flue dust, highly viscous slag and rubber sludge, sludge from cellulose manufacture, alkyl cellulose wastes, bitumen emulsions, acid resins and tars, sludge from petroleum refining, as well as worthless residues from the production of organic compounds, especially organic halogen compounds, etc.

The steps of the invention have as their object the increasing of the specific gravity of the liquid phase of the cavern contents. Here it must be borne in mind, among other things, that in a given cavern with salt deposits having a constant upper and lower depth to the cavern, the gradient of the internal pressure on the roof of the cavern with a specific gravity of the salt rock of 2.3 to 2.4 is smaller, the larger the specific gravity of the stored liquid phase. For example, if the cavern contents consist principally of solutions of inorganic salts, then these solutions are saturated with sodium chloride, which is dissolved out of the cavern walls. Here it has been tried to add magnesium sulfate and/or chloride as the soluble or dissolved salts in the context of the invention, these being available as wastes. Upon introducing corresponding amounts of said salts into the stored aqueous phase, the system $NaCl-MgSO_4-H_2O$ forms, from which the solid salts

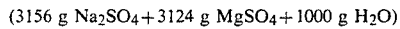
(3156 g $Na_2SO_4$+3124 g $MgSO_4$+1000 g $H_2O$)

or

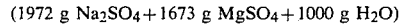
(1972 g $Na_2SO_4$+1673 g $MgSO_4$+1000 g $H_2O$)

crystallize at the cavern temperature. Similarly, upon introducing of the corresponding amounts of magnesium chloride into the cavern contents, there if formed from the system $NaCl-MgCl_2-H_2O$ the solid salt (1880 g $MgCl_2-1000H_2O$). Due to the resulting increase in concentration there occurs a simultaneous precipitation of solid sodium chloride.

In the storage of acid, pumpable wastes it is advantageous to neutralize these before, during or after introduction into the caverns with solid or dissolved alkaline materials. The preferred alkaline materials are alkaline-reacting materials, such as, for example, lime sludge.

There is also the possibility of adding the alkaline materials in corresponding amounts into the caverns before the acid wastes are introduced into the caverns.

Liquid wastes which have a specific gravity lighter or heavier than the aqueous phase and which separate above or below this phase can also be introduced into the caverns.

To increase the specific gravity of the cavern contents, there may also be introduced solid, finely divided wastes, such as, for example, ground slags or unworkable residues which separate upon dissolving natural materials. Especially suitable are solid waste salts which are technically worthless and whose disposal above ground is technically employed because of their solubility. In addition, unpurified dye wastes or spent absorbents may be introduced.

There wastes can, however, also be worked up above ground with the liquid wastes to form an uncombined, but still pumpable mixture.

There is also the advantageous possibility of adding to the liquid waste, outside or inside the cavern, wastes from the production of absorbents such as, for example, stratified lattices, such as zeolites, expanded vermiculites or perlites. These wastes have the advantage of a high adsorption capacity with only a small increase in volume.

As additives which increase the specific gravity of the liquid wastes introduced or to be introduced into the caverns, basically all solid or paste-like residues may be introduced according to the invention. Further suitable materials are salt residues or solutions of such salt residues which form salts containing water of crystallization or double salts at the temperature of the deposit of, for example, 50° to 70° C. The formation of such salts depends upon the presence of the system $NaCl-H_2O$ in the cavern in the salt deposit by saturation of unsaturated aqueous phases with sodium chloride.

Magnesium sulfate, which occurs in nature as the monohydrate kieserite, is stable at 35.6° C. as the heptahydrate, at 48.2° C. as the hexahydrate and at 67.5° C. as the monohydrate. It can be introduced as a thickening agent into a cavern whose deposit temperature is about 50° C.

In the system $MgSO_4-Na_2Cl_2-H_2O$ water of hydration-containing double salts such as astrakanite ($Na_2SO_4 \cdot MgSO_4 \cdot 4H_2O$) or loweite ($Na_2SO_4 \cdot 7/6MgSO_4 \cdot 2.5-H_2O$) are stable solid phases.

In this system, astrakanite is stable up to 59° C. and loweite is stable from 49° to 110° C. These double salts can therefore separate out at deposit temperatures by the introduction of $MgSO_4$, preferably as impure kieserite, by combining with water after the reaction with sodium chloride and thereby increase the specific gravity or solidify the aqueous phase. Thereby NaCl can also precipitate out because of supersaturation.

In the system $MgCl_2-Na_2Cl_2-H_2O$, bischofite ($MgCl_2 \cdot 6H_2O$) is stable as a solid phase at 116.7° C. At 55° C., 20 moles NaCl and 45 moles of $MgCl_2$ are dissolved. The further addition of magnesium chloride leads to the precipitation of solid bischofite.

After saturation with NaCl, the saturated NaCl solution contains 36.7 g at 50° C. and 38.5 g at 70° C. of NaCl/100 g $H_2O$. The temperature coefficient is therefore low.

Also the density (g/l) of 1.20 at room temperature, 1.19 at 50° C. and 1.187 at 70° C. decreases only slightly at the deposit temperature. On the other hand, the solubility of MgSO$_4$ in 100 g water is 35.6 g at room temperature; 45.4 g at 40° C.; 54.4 at 60° C.; and 54.2 g at 83° C.

The corresponding specific gravity (g/l) is 1.30 at room temperature; 1.38 at 50° C.; 1.40 at 70° C. Therefore by introduction of MgSO$_4$ into the NaCl-containing aqueous solution, the specific gravity of the solution is increased.

The process of the invention also uses non-hydrate forming salts to precipitate in the aqueous phase. Such salts are introduced into the cavern at a higher temperature than the deposit temperature. Upon establishment of the deposit temperature such salts as Na$_2$SO$_4$ separate out due to the decrease in solubility as the temperature falls. If heavy metals, such as iron, cadmium or lead, are present in the aqueous phase of the wastes, these can be precipitated out with alkaline materials because of the low solubility of their hydroxides or carbonates.

It is also possible to precipitate magnesium and calcium as hydroxides or carbonates in order to increase the density of the aqueous phase.

Also there can be introduced into the cavern solutions of salts whose solubility is lowered after saturation of the solution with sodium chloride so that these salts are "salted out" and as solids increase the density of the liquid phase of the cavern contents.

The process of the invention is preferably carried out in pear-shaped or cylindrical caverns whose vertical dimensions are larger than the maximum diameter of the cavern. The filling of the caverns, especially from below the casing shoe, should be carried out so that the "Frac" to break open pressure at the casing shoe is not exceeded. The sealing of the cavern takes place after establishment of a temperature equilibrium in the cavern. This is reached in a short time due to the good heat conductance of the salt mineral.

The process of the invention increases the specific gravity of the liquid or the solid-liquid phase of the waste as the solution of the stated problem. Accordingly solid salts or solid finely divided materials are added to the liquid waste with the formation of a suspension. Such solid-liquid phases are however also especially formed by precipitation of crystallizing salts from the solution of by precipitation of salts containing combined water of crystallization. By the resulting increase of the specific content of solids, the paste-like consistency of the suspension or the solidification of the liquid phase or phases through combination with water as water of crystallization is obtained.

These steps according to the process of the invention also result in the solidification of thickening of the liquid phase by reactions of the deposited materials with each other, for which organic material can also be considered, which by hardening or solidification contribute to the soldification of the liquid phase of the cavern contents.

The process of the invention makes use of the technical effect of opposing the outside pressure of the salt cavern with as high as possible inside pressure. As soon as the outside pressure and the inside pressure are equal through a decreased convergence, the convergence comes to a standstill through this equilibrium.

In order that the internal pressure which appearing under these conditions as a non-compressible liquid phase can build itself up as a back pressure, the cavern is closed after being filled and after establishment of the temperature of the deposit. In order that the internal pressure from the convergence will not exceed certain limits, according to the process of the invention, the smallest possible difference in specific gravity (kg/m$^3$) is established in the liquid phase or phases in the cavern. The internal pressure on the cavern roof is smaller the larger the specific gravity of the deposited liquid or solid-liquid wastes in their phases in contrast with the density of the salt bed.

The convergence is diminished by narrowing the difference between the specific gravity of the salt mineral of around d = 2.4 and that of the liquid phase of about d = 1.2 to 1.3 by the increased value in the suspension or the solid mass of wastes.

To reach this technical effect, the process of the invention shows the advantage that wastes can be used which are not further utilizable or salt minerals or salts can be used which are not disposable in large amounts.

The process of the invention shows the further technical advantage that water is bound as solid water of hydration by precipitation of the hydrated double salts at the deposit temperature. Thereby the proportion of solid to liquid phase in the suspension is in favor of a larger solid portion and thereby the specific gravity increases.

The process of the invention shows the still further advantage of the gradual decrease of the convergence to a standstill. Thereby the safety of the cavern filled with the deposited wastes for terminal storage is increased because the internal pressure on the cavern roof is kept lower.

The process of the invention in contrast to above ground disposal or the above ground solidification for underground disposal permits pumping the wastes into empty or water- or salt solution-filled caverns in a technologically simple way. The disadvantages of the prior art are avoided and a problem-free terminal storage of wastes in salt caverns effected, which in no way burdens or endangers the environment. The process of the invention thus fulfills an important economic need.

In an effort to set forth the nature of the invention more specifically an above ground experiment was run, since it is very difficult to give more or less exact measurements of components, reactants, volumes, etc. when dealing with the huge salt caverns where the terminal storage of the wastes of this invention occur. Thus, in the following example, the results of a pilot plant-type study is set forth.

EXAMPLE

An above ground salt mine was constructed having the size of about 0.8 m$^3$ and which has been finished by grinding to have equal and smooth surfaces, with both the top and bottom sides so that the resulting surfaces are parallel. This above ground salt mine has on the top side thereof in the center a cylindrical recess or cavity formed with a diameter of about 16 centimeters and a volume of about 10 liters. Such a recess or cavity serves as a model for the charging of the liquid waste materials according to the process of the present invention.

There is first charged from a tossing tub, under agitation, an aqueous slurry of a mixture consisting of CaO—Ca(OH)$_2$ having a CaO content of about 25 to 30% by weight and having a volume of about 2 liters in the liquid phase.

There is then introduced into this alkaline phase with agitation about 2 liters of a mixture comprising acid slurry resulting from the dye and pigment manufacturing with a content of 9% H$_2$SO$_4$; 5% FeSO$_4$, 5% inorganic solid slurry components and 0.4% heavy metals (Mn, V, Cr, Ti) having a density of 1.2 g/l and a boiling point of 115° C.

40 to 100 grams of a synthetic waste material, such as PVC is comminuted to a width and length of less than 200 mm, but preferably to a dimension of 50 to 150 mm and charged to the salt mine.

40 to 100 grams of solid salts comprising contaminated $(NH_4)_2SO_4$ resulting from the organic synthesis is then comminuted by coarse grinding to a size to prevent the presence of large lumps and also charged to the salt mine.

This mixture is then permitted to rest and during this rest period, a saturation of the aqueous solution will take place with the soluble inorganic salt. The remaining quantity then becomes sedimented, thus contributing to the solidification of the cavern by increasing the sedimentation volume. A partial quantity of the solid synthetic waste material becomes embedded in the sedimentation volume after such parts have been carried along during the pumping-in process. The remaining partial quantity will swim on the heavier liquid phase.

200 to 400 grams of $MgSO_4$ is then introduced in the form of soiled or contaminated kieserite, $MgSO_4 \cdot H_2O$ or water free kieserite in the form of solid materials. Such salt will deposit in the system of $NaCl$—$MgSO_4$—$H_2O$ into the double salt astrakanite, which is $Na_2SO_4 \cdot MgSO_4 \cdot H_2O$. The result is a $MgCl_2$ solution which upon oversaturation will precipitate in the form of solid $MgCl_2$. It is important that the temperature of the deposits which sets in during the rest period at up to 60° give rise to the formation of stable solids from the double salt content in the crystal water. Such crystallization of the hydratized double salts will lead to the binding of the water and to the crystallization of the salts through salting out at over-saturation of the liquid phase to an intended solidification of the mass in the recess of the cavern.

The further addition of 50 grams of vermiculite to the solid materials lead to the solidification of the waste materials.

While this invention has been illustrated and described in connection with certain preferred embodiments thereof, it will be apparent to those skilled in the art that the invention is not limited thereto. Accordingly, it is intended that the appended claims cover all modifications which are within the true spirit and scope of the invention.

We claim:

1. A process for terminal storage of a water-containing pumpable waste containing a liquid phase comprising the steps of pumping said waste into a salt cavern and increasing the specific gravity of said liquid phase with a material selected from the group consisting of soluble salts which crystallize at cavern temperature with incorporation of water of crystallization from the liquid phase and are selected from the group consisting of $MgCl_2$, $MgSO_4$ and mixtures thereof in an amount sufficient to form, in the $NaCl$—$MgSO_4$—$H_2O$ system, a solid salt selected from the group consisting of (3156 g $Na_2SO_4$ + 3124 g $Mg_2SO_4$ + 1000$H_2O$) and (1972 g $Na_2SO_4$ + 1673 g $MgSO_4$ + 1000$H_2O$) and in the $NaCl$—$MgCl_2$—$H_2O$ system, the solid salt (1880 g $MgCl_2$ + 1000$H_2O$); solutions of said salts; organic materials which solidify at cavern temperature in the liquid phase of the pumpable waste or increase the specific gravity thereof; and adsorbents, in order to minimize convergence of the salt cavern by narrowing the difference between the specific gravity of the salt cavern walls and the specific gravity of the liquid phase of the pumpable waste by converting the liquid phase to a paste-like or solid consistency.

2. The process of claim 1, wherein solid NaCl is also precipitated.

3. The process of claim 1, further comprising the step of neutralizing the waste with an alkaline material before, during or after filling of the cavern with said waste.

4. The process of claim 1, wherein the pumpable waste consists of an aqueous phase and a liquid phase having a specific gravity less than that of the aqueous phase.

5. The process of claim 1, wherein the pumpable waste consists of an aqueous phase and a liquid phase having a specific gravity greater than that of the aqueous phase.

6. The process of claim 1, wherein finely divided solid wastes are added to the pumpable wastes in the cavern.

7. The process of claim 1, further comprising the step of sealing the cavern after the waste has attained temperature equilibrium with the cavern.

8. The process of claim 1, further comprising the step of sealing the cavern after extensive solidification of the waste has occurred.

9. The process of claim 1, wherein the solution of salts is saturated at a temperature above the cavern temperature and said temperature of the solution is maintained in the cavern.

10. The process of claim 1, wherein the solution of salts is saturated with sodium chloride dissolved from the salt cavern walls thus causing said salts to crystallize out.

11. The process of claim 1, wherein the cavern is pear-shaped or cylindrical and has a vertical dimension larger than its maximum diameter.

12. The process of claim 1, wherein the pumpable waste contains, in its aqueous phase, salts which form insoluble hydroxides or carbonates, and further comprises the step of adding an alkaline material to said waste to precipitate said hydroxides or carbonates.

13. The process of claim 11, wherein the pumpable waste contains heavy metal salts in its aqueous phase and said alkaline material is added as a solid or in solution to said waste to precipitate said heavy metals as hydroxides or carbonates.

14. The process of claim 1, wherein the solid materials are selected from the group consisting of expanded vermiculites, expanded perlites, hydrated mica and kieselguhr.

15. The process of claim 1, wherein the cavern is one which had been filled with a liquid selected from the group consisting of water and aqueous NaCl solution and which had been emptied before pumping in the waste and wherein the cavern is filled with waste to about the same depth as it had been full of said liquid.

* * * * *